United States Patent
Hrabik et al.

(10) Patent No.: US 7,167,485 B2
(45) Date of Patent: Jan. 23, 2007

(54) METHOD AND APPARATUS FOR SCHEDULING PACKETIZED DATA FLOWS IN A CALENDAR-BASED ARBITRATION SCHEME

(75) Inventors: Terry J. Hrabik, South Bend, IN (US); Robert B. Magill, Mishawaka, IN (US); Ravi Chandran, South Bend, IN (US); Kent D. Benson, Granger, IN (US)

(73) Assignee: Tellabs Operations, Inc., Naperville, IL (US)

( * ) Notice: Subject to any disclaimer, the term of this patent is extended or adjusted under 35 U.S.C. 154(b) by 935 days.

(21) Appl. No.: 10/022,628

(22) Filed: Dec. 17, 2001

(65) Prior Publication Data

US 2003/0112750 A1  Jun. 19, 2003

(51) Int. Cl.
*H04L 12/43* (2006.01)
*H04L 12/56* (2006.01)
*H04L 12/26* (2006.01)

(52) U.S. Cl. .................. 370/461; 370/395.4; 370/235
(58) Field of Classification Search ............... 370/229, 370/230, 235, 395.4, 395.71, 412, 428, 429, 370/437, 458, 461, 462, 468
See application file for complete search history.

(56) References Cited

U.S. PATENT DOCUMENTS

| 5,241,536 | A | | 8/1993 | Grimble et al. |
|---|---|---|---|---|
| 5,500,858 | A | | 3/1996 | McKeown |
| 5,517,495 | A | | 5/1996 | Lund et al. |
| 5,859,856 | A | | 1/1999 | Oskouy et al. |
| 5,872,769 | A | | 2/1999 | Caldara et al. |
| 5,875,176 | A | | 2/1999 | Sherer et al. |
| 5,996,019 | A | | 11/1999 | Hauser et al. |
| 6,064,676 | A | | 5/2000 | Slattery et al. |
| 6,128,282 | A | * | 10/2000 | Liebetreu et al. ........... 370/235 |
| 6,160,812 | A | | 12/2000 | Bauman et al. |
| 6,343,066 | B2 | | 1/2002 | Magill et al. |
| 6,885,639 | B2 | * | 4/2005 | Kamiya ..................... 370/235 |
| 6,895,015 | B1 | * | 5/2005 | Chiang et al. .............. 370/429 |
| 2004/0160978 | A1 | * | 8/2004 | Jones et al. ................. 370/461 |

* cited by examiner

*Primary Examiner*—Ricky Q. Ngo
*Assistant Examiner*—Feben Micael Haile
(74) *Attorney, Agent, or Firm*—Lawrence M. Cho

(57) ABSTRACT

An arbitration unit according to an embodiment of the present invention is disclosed. The arbitration unit includes an allocation unit that assigns a first number of slots in a frame to a first flow and a second number of slots in the frame to a second flow. The arbitration unit includes a scheduling unit that assigns first slot positions to the first number of slots in the frame and second slot positions to the second number of slots in the frame using a binary distribution tree.

21 Claims, 13 Drawing Sheets

METHOD AND APPARATUS FOR SCHEDULING PACKETIZED DATA FLOWS IN A CALENDAR-BASED ARBITRATION SCHEME

FIELD OF THE INVENTION

The present invention relates to the field of data networking. More specifically, the present invention relates to data flow schedulers in a packetized data network.

BACKGROUND

A data network typically includes a plurality of nodes connected by links, where a node includes specialized equipment designed for receiving data on input links and forwarding the incoming data to the appropriate output links. In any data network, some number of the nodes must connect to network terminals that serve as data sources and sinks. The data passing through any node may be partitioned into flows according to the source terminal and destination terminal. Such a partitioning may be regarded as the minimum requirement to meet the definition of flow. Further partitioning, such as that based on a session identifier, will simply result in a larger set of flows. In a typical data network, a given flow will traverse through a multitude of links and nodes before arriving at its destination terminal and a multitude of flows will pass through any given node.

In most data networks, flows are segmented into discrete packets. A packet consists of a header and the payload. The header contains control information (e.g., source and destination terminal identifiers) used for making forwarding decisions and may contain additional information for other uses (e.g., a sequence number used for re-sequencing packets at the destination terminal). By segmenting flows into packets, network utilization may be improved by eliminating useless information (e.g., silence during a conversation) and by dynamically rerouting packets through the network to avoid congestion.

In a packetized data network, nodes may become contention points where more packets arrive than leave during a given time interval. Buffers may be used to store packets until the packets can be transmitted onto the data link. The size of the buffers may have a direct impact on the amount of data loss. Adding more buffers at a given node in the network will alleviate loss, but the additional memory adds cost to the networking equipment.

In a typical network topology, a larger number of flows is incident on the interior nodes than on the edge nodes. The interior nodes are connected to high-speed links to accommodate the larger volume of traffic and the memory devices at the interior nodes must be correspondingly faster than those at the edge nodes. Because faster memory is more expensive, the unit cost of buffering is larger at the interior nodes than it is at the edge nodes. Therefore, to minimize the overall cost of the network, the amount of buffering at the interior nodes should be minimized.

In addition to the size of the buffers, the manner in which the packets arrive may effect the amount of loss experienced by a set of flows at a given node. For example, if the flows arrive in a bursty manner such that several packets arrive one after another in a burst followed by a period during which no packets arrive, more loss will occur than would have occurred if the flows arrived at a more steady rate. Thus, the amount of buffering required at the interior nodes in a network may be reduced by smoothing the flows at the edge nodes such that the amount of data sent per unit time is approximately constant. Smoothing at the edge nodes will generally require more buffering at the edge nodes, but results in a smaller buffer requirement at the interior nodes where memory is more costly. Perfect smoothing is not achievable under most circumstances because of the manner in which packets may arrive at the edge node, contention among the various flows at the edge node, and the packetized nature of the data.

An arbitration mechanism is required at each network node to determine which packet is allowed access to an outgoing link during a given time slot. In some cases, the arbitration mechanism is fixed by the queuing strategy used in the node. For example, in a typical queuing strategy called per-output queuing, packets are classified according to the destination output link and queued accordingly. With per-output queuing, the arbitration mechanism is implicitly first-in-first-out (FIFO), where all packets destined for a given output link are sent in the order in which they were queued. Per-output queuing does not result in a sufficient amount of smoothing to cause a significant reduction in the amount of buffering required at the interior nodes of a network.

If a more sophisticated queuing structure is used, the arbitration mechanism may be more explicit. For example, in per-flow queuing, the packets are queued according to the flow to which they belong and an arbiter must choose among a set of queues corresponding to the set of flows destined for a given output link. Because the arbiter has flow-level visibility, per-flow queuing is a necessary requirement for producing smooth outgoing flows for arbitrary arrival patterns. However, it is the arbiter that plays the primary role in producing smooth flows.

Those mechanisms that do produce smooth outgoing flows suffered the drawback of having to execute complicated algorithms which required costly hardware circuitry to implement, thereby eliminating the cost advantage of the reduced amount of memory required at the interior nodes. Thus, what is needed is a scheduling mechanism that produces relatively smooth outgoing flows in an efficient manner.

SUMMARY OF THE INVENTION

An arbitration unit according to an embodiment of the present invention is disclosed. The arbitration unit includes an allocation unit that assigns a first number of slots in a frame to a first flow and a second number of slots in the frame to a second flow. The arbitration unit includes a scheduling unit that assigns first slot positions to the first number of slots in the frame and second slot positions to the second number of slots in the frame using a binary distribution tree.

A method for processing allocation numbers according to an embodiment of the present invention is disclosed. A common drift direction is set at bifurcation points in a binary distribution tree. Allocation numbers associated with a first flow is divided by two at the bifurcation points. Quotients from the dividing of the allocation numbers associated with the first flow is assigned to branches at the bifurcation points. A remainder from the dividing of the allocation numbers associated with the first flow is assigned to a branch that corresponds to a drift direction at the bifurcation point where the remainder exists. The drift direction at the bifurcation point where the remainder exists is switched. Outputs from the binary distribution tree are read as elements in a first binary permission vector.

BRIEF DESCRIPTION OF THE DRAWINGS

The features and advantages of the present invention are illustrated by way of example and are by no means intended to limit the scope of the present invention to the particular embodiments shown, and in which.

DETAILED DESCRIPTION

In the following description, for purposes of explanation, specific nomenclature is set forth to provide a thorough understanding of the present invention. However, it will be apparent to one skilled in the art that these specific details may not be required to practice the present invention. In other instances, well known circuits and devices are shown in block diagram form to avoid obscuring the present invention unnecessarily. Additionally, the interconnection between circuit elements or blocks may be shown as buses or as single signal lines. Each of the buses may alternatively be single signal lines, and each of the single signal lines may alternatively be buses.

Figure 1:
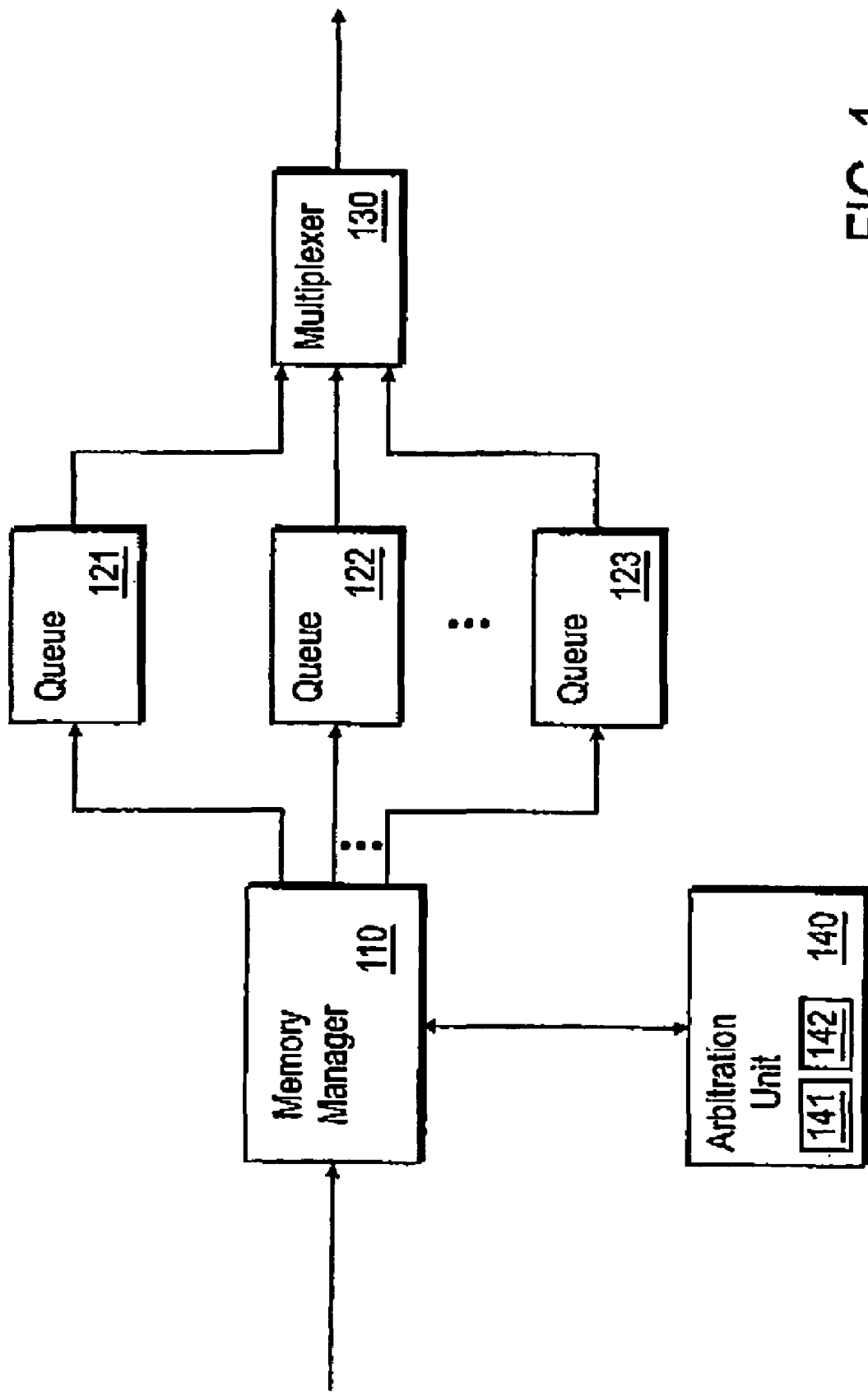
FIG. 1 is a block diagram illustrating a segment of a network implementing an embodiment of the present invention.

FIG. 1 is a block diagram illustrating a segment of a network implementing an embodiment of the present invention. Block 110 represents a memory manager. The memory manager 110 receives a plurality of flows of packetized data from an input. The memory manager 110 demultiplexes the input, identifies and classifies the flows of packetized data, and transmits the flows of packetized data into queues. In response to scheduling instructions, the memory manager 110 generates control signals that operate to forward packetized data stored in the queues.

Blocks 121–123 represent a plurality of queues. The queues 121–123 receive packetized data from the memory manager 110. Each queue stores packetized data from a specified flow. Each queue also receives control signals from the memory manager 110 that prompts it to transmit out stored data.

Block 130 represents a multiplexer. The multiplexer 130 receives packetized data from each of the queues 121–123. The multiplexer 130 multiplexes the packetized data received into a single stream. The multiplexer 130 may transmit the multiplexed stream into a buffer (not shown) for storage before transmission onto a data link.

Block 140 represents an arbitration unit. The arbitration unit 140 includes an allocation unit represented by sub-block 141 and a scheduler unit represented by sub-block 142. The arbitration unit 140 directs the transmission of packetized data from the queues 121–123 to the multiplexer 130 through scheduling instructions it sends to the memory manager 110. According to an embodiment of the present invention, the arbitration unit 140 implements a calendar-based arbitration scheme. The arbitration unit 140 divides time into frames having a constant number of time slots. The allocation unit 141 assigns a number of time slots per frame to each flow such that the total number of slots assigned across all flows do not exceed the length of the frame. The scheduler unit 142 assigns individual time slots in a given frame to the flows of packetized data stored in each of the queues 121–123. In assigning the individual time slots in a given frame to a flow, the scheduler unit 142 ensures that the total number of slots assigned to a given flow does not exceed the flow's allocation for the frame, and that a given slot is not assigned to more than one flow.

Figure 2:
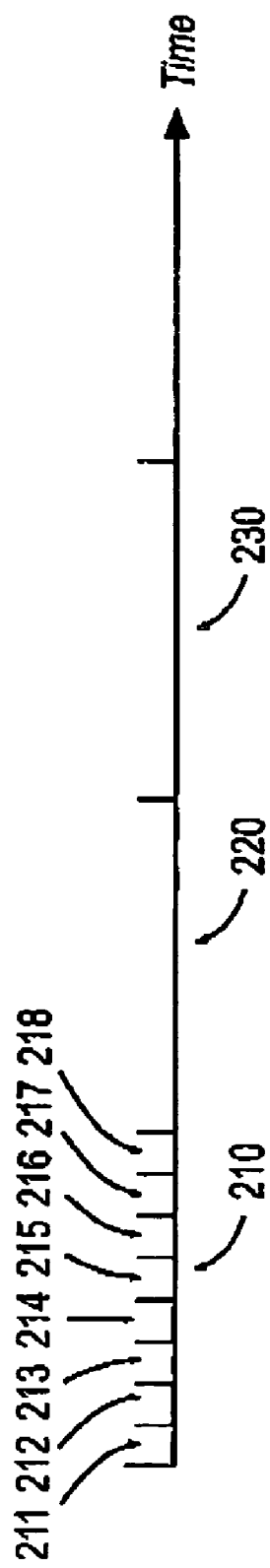
FIG. 2 illustrates an example of how the arbitration unit processes data flows according to an embodiment of the present invention.

FIG. 2 illustrates a conceptual perspective of how the arbitration unit 140 processes data flows according to an embodiment of the present invention. In this example, an interval of time is divided into a plurality of frames 210, 220, and 230. Each of the frames include a constant number of time slots. As shown, frame 210 has 8 time slots 211–218. The scheduler unit 142 (shown in FIG. 1) assigns each of the individual time slots 211–218 in frame 210 to flows of packetized data stored in queues 121–123 (shown in FIG. 1) based upon the number of slots per frame assigned to each of the flows by the allocation unit 141 (shown in FIG. 1). For example, if a first flow stored in queue 121 is assigned an allocation number of 3 time slots per frame, a second flow stored in queue 122 is assigned an allocation number of 1 time slots per frame, and a third flow stored in queue 123 is assigned an allocation number of 2 time slots per frame, the scheduler unit 142 may assign time slots 211, 213, and 215 to the first flow, time slot 217 to the second flow, and time slots 212 and 216 to the third flow. In this example, time slots 211, 213, and 215 may represent first positions in a frame for the time slots of the first flow. Time slot 217 may represent a second position in the frame for the time slot of the second flow. Time slots 212 and 216 may represent third positions in the frame for the time slots of the third flow.

Figure 3:
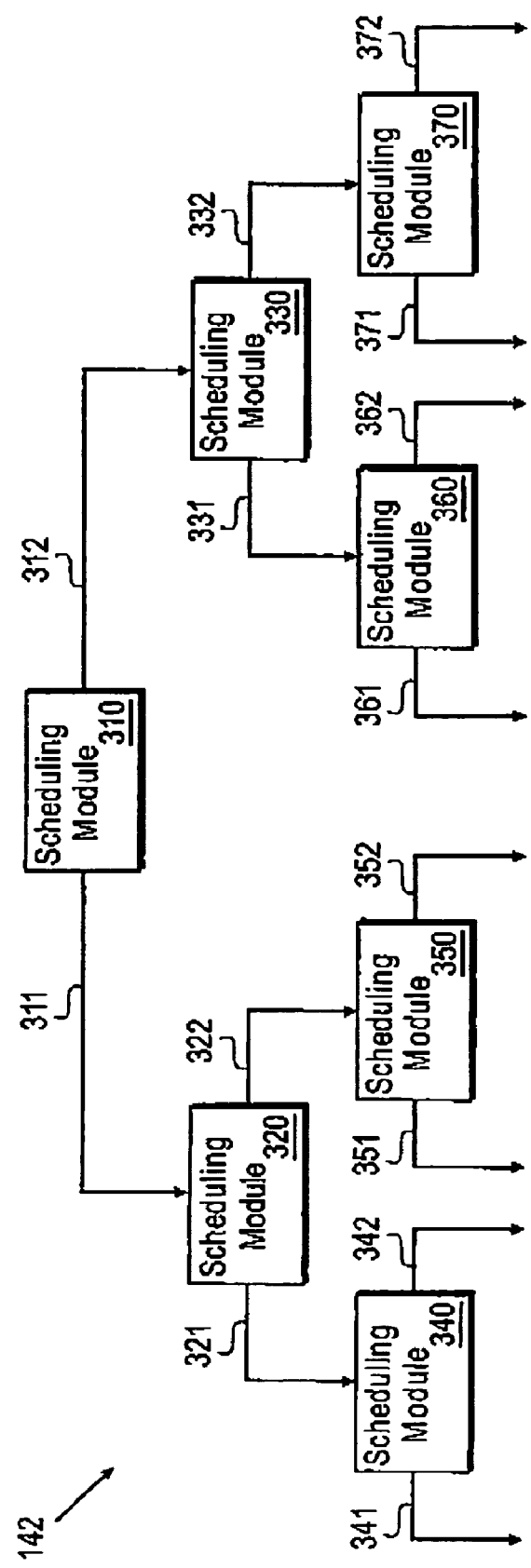
FIG. 3 is a block diagram of a scheduling unit according to an embodiment of the present invention.

FIG. 3 is a block diagram of a scheduling unit 142 according to an embodiment of the present invention. The scheduling unit 142 is a binary distribution tree having a plurality of scheduling modules 310, 320, 330, 340, 350, 360, and 370. Each scheduling module resides on a module level. Scheduling module 310 resides on a first module level. Scheduling modules 320 and 330 reside on a second module level. And scheduling modules 340, 350, 360, and 370 reside on a third module level. Each scheduling module has two outputs. Scheduling modules residing on module levels other than the highest numerical module level have outputs coupled to scheduling modules in the next module level. The number of module levels and the number of scheduling modules in a scheduling unit 142 depends on a number of time slots, T, the arbitration unit 140 allocates per frame, where $T=2^P$ and P is a positive integer. According to an embodiment of the arbitration unit 140, the number of module levels in a scheduling unit equals P and the number of scheduling modules in a scheduling unit equals T–1. The scheduling unit 142 will always have a single scheduling module on the first module level. Any proceeding module level will have twice as many scheduling modules as a preceeding module level. FIG. 3 illustrates a scheduling unit 142 configured for an arbitration unit that allocates 8 time slots per frame.

According to an embodiment of the arbitration unit 140, the scheduling unit 142 generates a binary permission vector for each of the queues 121–123 (shown in FIG. 1). Binary permission vectors may operate as scheduling instructions for directing the memory manager 110 (shown in FIG. 1) as to how it should forward packetized data stored in the queues 121–123. Each of the outputs from the scheduling modules in the highest module level corresponds to an element in the binary permission vector. In this example, outputs 341 and 342 correspond to a first and second element in a binary permission vector, outputs 351 and 352 correspond to a third and fourth element in a binary permission vector, outputs 361 and 362 correspond to a fifth and sixth element in a binary permission vector, and elements 371 and 372 correspond to a seventh and eighth element in a binary permission vector. Each element of a binary permission vector corresponds to a slot in the calendar frame and contains a binary result (yes or no), indicating whether or not an associated flow or queue has permission to send a packet during the corresponding slot.

A first allocation number, $a_1$, corresponding to the time slots per frame to a first flow, may be transmitted to the scheduling module on the first module level of the scheduling unit 142. In this example, the scheduling module on the first module level is scheduling module 310. The scheduling module on the first module level divides the allocation number by two. The scheduling module 310 transmits the quotient from the result to its corresponding outputs. The scheduling unit 142 also implements a remainder drift rule for all its scheduling modules where a remainder at a given bifurcation in the scheduling unit 142 will drift to the right most output if the most recent flow that produced a reminder at the same bifurcation drifted to the left most output. Similarly, a remainder at a given bifurcation will drift to the left most output if the most recent flow that produced a remainder at the same bifurcation drifted to the right most output. If no prior flows produced a remainder at a given bifurcation, a leftward remainder drift is assumed. Thus, for the first allocation number, any remainder resulting from scheduling module 310 is transmitted to its left most output 311.

The results on each of the outputs 311 and 312 are summed and transmitted to the next module level as inputs to corresponding scheduling modules 320 and 330 on the second module level. Similarly, each of the scheduling modules on the second module level divide their inputs by two and apply the remainder drift rule. The results on the outputs are summed and transmitted to the next module level corresponding to scheduling modules 340, 350, 360, and 370 which perform the same operation. The results from the outputs of scheduling modules 340, 350, 360, and 370 correspond to elements in a binary permission vector for the first flow.

The binary distribution tree process described above can be visualized by first dividing the frame into two equal sized sub-frames and dividing the allocation as evenly as possible across the two sub-frames. If the allocation is odd, there will be a unity remainder after division by two. A choice is made as to which sub-frame the remainder will be assigned to. Next, each of the two sub-frames is divided into two equal-sized sub-sub-frames, and the numbers of slots that were assigned to the two sub-frames are distributed as evenly as possible across the corresponding sub-sub-frames. As before, the number of slots assigned to the sub-frame may be odd. If so, a choice is made as to which sub-sub-frame will receive the remainder. This process of continuously dividing the frame (and the allocation) stops when the frame can no longer be divided without dividing slots into sub-slots.

Each of the scheduling modules in the scheduling unit 142 includes a divider (not shown) that is capable of performing division on an allocation number or a product of the allocation number. Each of the scheduling modules also includes a memory module (not shown). The memory module implements the remainder drift rule to prevent multiple flows from receiving permission to send a packet in the same slot. The allocations (one per flow) are passed through the scheduling unit 142 sequentially. The direction of remainder drift at each bifurcation for a given flow depends on the direction chosen at that bifurcation for prior flows. Each of the scheduling modules also includes an adder (not shown) for adding the quotient to any remainder at its output.

Figure 4:
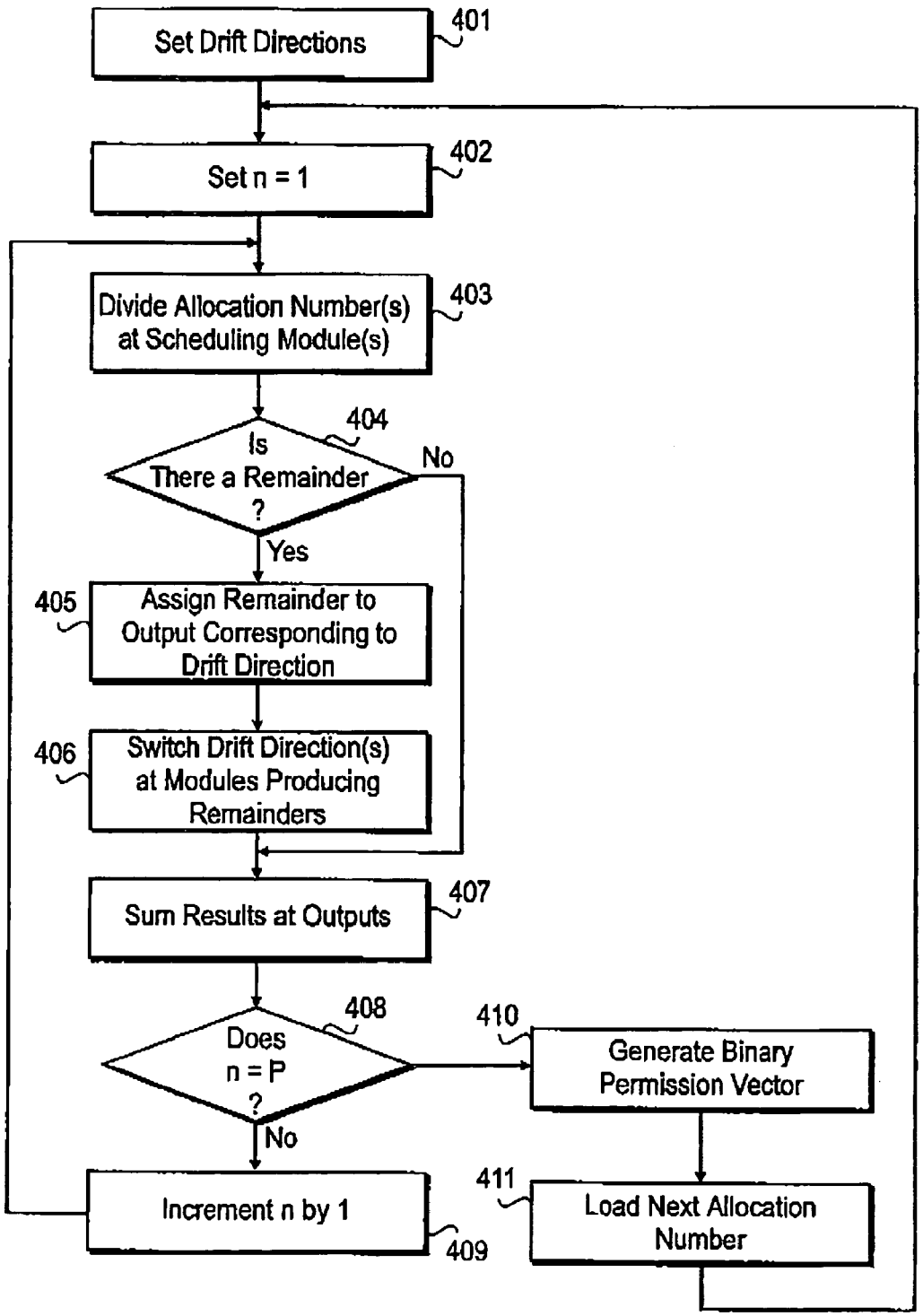
FIG. 4 is a flow chart illustrating a method for generating a binary permission vector according to an embodiment of the present invention.

FIG. 4 is a flow chart illustrating a method for generating a binary permission vector according to an embodiment of the present invention. At step 401, drift directions for all scheduling modules are set. Drift directions are used to refer to one of two outputs (a left most output or a right most output) in a scheduling module for the purposes of assigning a remainder. According to an embodiment of the present invention a leftward remainder drift direction is assumed. Alternatively, a rightward remainder drift direction may be assumed.

At step 402, set n to one. According to an embodiment of the present invention, n is a counter value that indicates a stage of processing that is being or has been performed.

At step 403, allocation numbers are divided. According to an embodiment of the present invention, allocation numbers are divided by two at the scheduling modules to where they are transmitted. The quotients of the divisions are assigned to the corresponding outputs of each scheduling module. At the first stage of processing, only one allocation number is divided by one scheduling module.

At step 404, it is determined whether there is a remainder. According to an embodiment of the present invention, it is determined whether any of the scheduling modules calculated a result that yielded a remainder. If there is a remainder, control proceeds to step 405. If there is not a remainder, control proceeds to step 407.

At step 405, remainders at scheduling modules are assigned to outputs at the scheduling modules corresponding to the drift direction.

At step 406, drift directions at scheduling modules producing remainders are switched. Drift directions at scheduling modules not producing remainders are left alone.

At step 407, the results at the outputs of the scheduling modules are summed. If the outputs are coupled to scheduling modules at a next module level, the results are forwarded to their corresponding scheduling modules as allocation numbers for those scheduling modules.

At step 408, it is determined whether n is equal to P, where $2^P$ equals the time slots per frame allocated by the arbitration unit. If n is equal to P control proceeds to step 410. If n does not equal to P, control proceeds to step 409.

At step 409, n is incremented by one. Control proceeds to step 403.

At step 410, a binary permission vector is generated. According to an embodiment of the present invention, the results at the outputs of the scheduling modules correspond to elements of the binary permission vector.

At step 411, a next allocation number is loaded to a scheduling module on the first module level. Control proceeds to step 402.

FIG. 4 illustrates a flow chart describing a method for generating a binary permission vector according to embodiments of the present invention. Some of the steps illustrated may be performed sequentially or in an order other than that which is described. It should be appreciated that not all of the steps described may be required, that additional steps may be added, and that some of the illustrated steps may be substituted with other steps.

Figure 5A:
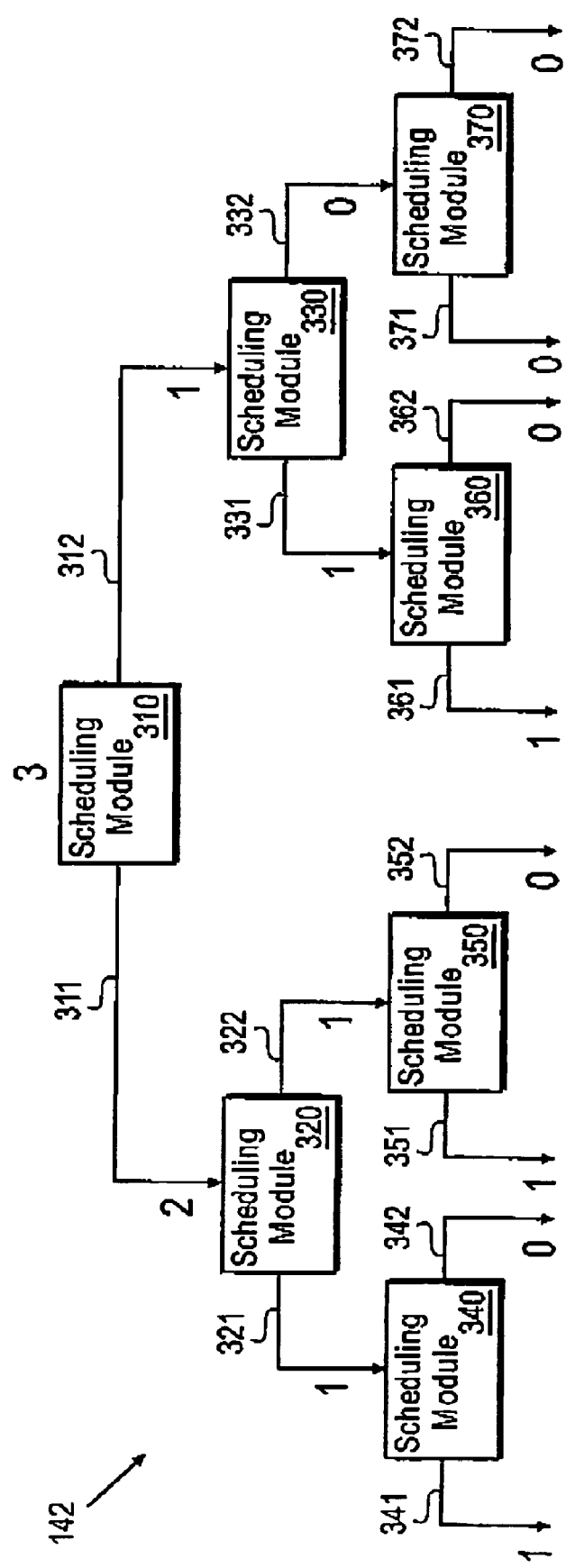
FIG. 5a is an example of the scheduling unit shown in FIG. 3 processing a first flow according to an embodiment of the present invention.
Figure 5B:
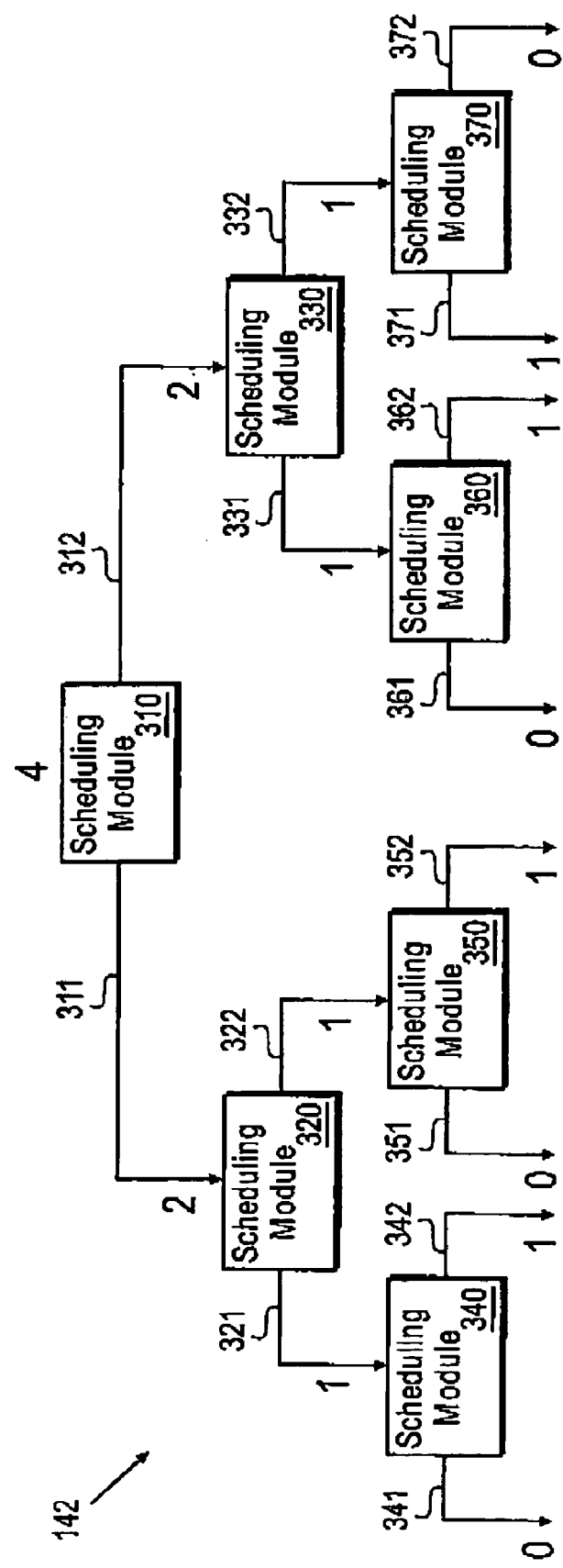
FIG. 5b is an example of the scheduling unit shown in FIG. 3 processing a second flow according to an embodiment of the present invention.
Figure 5C:
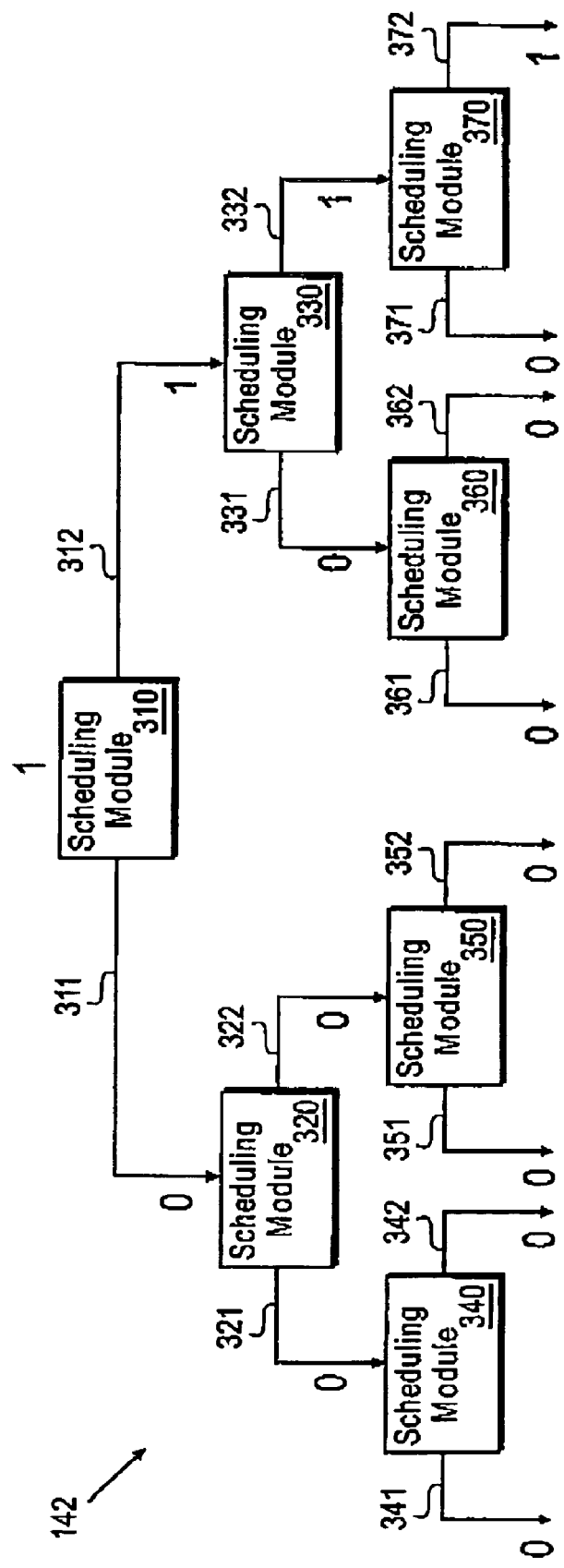
FIG. 5c is an example of the scheduling unit shown in FIG. 3 processing a third flow according to an embodiment of the present invention.

FIGS. 5a–5c illustrate an example of the scheduling unit shown in FIG. 3 generating binary permission vectors according to an embodiment of the present invention. The process of generating a binary permission vector is shown with the aid of FIG. 4. In this example, the arbitration unit 140 (shown in FIG. 1) allocates a frame size of T=8 slots per frame. There are three flows with allocation numbers $a_1=3$, $a_2=4$, and $a_3=1$.

FIG. 5a illustrates the scheduling unit 142 processing the first allocation number $a_1=3$ for the first flow. At step 401, drift directions for all the scheduling modules are set. In this example, a leftward drift direction for the scheduling modules 310, 320, 330, 340, 350, 360, and 370 are set.

At step 402, n is set to one to indicate that the current stage of processing is being performed at the first module level.

At step 403, allocation numbers are divided. In this example, the allocation number 3 for the first flow is divided by 2 by the scheduling module 310. The quotient of the division, 1, is assigned to the corresponding outputs 311 and 312 of the scheduling module 310.

At step 404, it is determined whether there is a remainder from the calculation performed at step 403. It is determined that there is a remainder to the division calculation performed by scheduling module 310. Control thus proceeds to step 405.

At step 405, the remainders are assigned to the outputs at the scheduling modules corresponding to the drift directions. In this example, the remainder, 1, is assigned to the output of scheduling module 310 that corresponds to the drift direction. The drift direction for scheduling module 310 is set to the left. Thus, the remainder is assigned to the output 311.

At step 406, drift directions at scheduling modules producing remainders are switched. In this example, the drift direction at scheduling module 310 is switched from the leftward direction to the rightward direction.

At step 407, the results at the outputs of the scheduling modules are summed. The scheduling module 310 yields the value of 2 at output 311, and 1 at output 312. These values are forwarded to their corresponding scheduling modules, 320 and 330 respectively, at the next module level as allocation numbers.

At step 408, it is determined whether n is equal to P, where $2^P$ equals the time slots per frame allocated by the arbitration unit. In this example, P=3. Since 1 is not equal to 3, control proceeds to step 409.

At step 409, n is incremented by one. Control proceeds to step 403.

At step 403, allocation numbers are divided. In this example, the allocation number 2 is divided by 2 by the scheduling module 320. The quotient of the division, 1, is assigned to outputs 321 and 322. The allocation number 1 is divided by 2 by the scheduling module 330. The quotient of the division, 0, is assigned to outputs 331 and 332.

At step 404, it is determined whether there is a remainder in the calculation performed by the scheduling modules 320 and 330. It is determined that a remainder resulted from the calculations performed by the scheduling module 330. Control proceeds to step 405.

At step 405, the remainders are assigned to the outputs at the scheduling modules corresponding to the drift directions. The remainder, 1, is assigned to the output of scheduling module 330 that corresponds to the drift direction of scheduling module 330. The drift direction for scheduling module 330 is set to the left. Thus, the remainder is assigned to the leftmost output 321.

At step 406, drift directions at scheduling modules producing remainders are switched. In this example, the drift direction at scheduling module 330 is switched from the leftward direction to the rightward direction. The drift direction at scheduling module 320 is left alone.

At step 407, the results at the outputs of the scheduling modules are summed. The scheduling module 320 yields the value of 1 at output 321, and 1 at output 322. The scheduling module 330 yields the value 1 at output 331, and 0 at output 332. These values are forwarded to their corresponding scheduling modules, 340, 350, 360, and 370 respectively, at the next module level as allocation numbers for those scheduling modules.

At step 408, it is determined whether n is equal to P, where $2^P$ equals the time slots per frame allocated by the arbitration unit. Since 2 is not equal to 3, control proceeds to step 409.

At step 409, n is incremented by one. Control proceeds to step 403.

At step 403, allocation numbers are divided. In this example, the allocation number 1 is divided by 2 by the scheduling module 340. The quotient of the division, 0, is assigned to the corresponding outputs 341 and 342. The allocation number 1 is divided by 2 by the scheduling module 350. The quotient of the division, 0, is assigned to the corresponding outputs 351 and 352. The allocation number 1 is divided by 2 by the scheduling module 360. The quotient of the division, 0, is assigned to the corresponding outputs 361 and 362. The allocation number 0 is divided by 2 by the scheduling module 370. The quotient of the division, 0, is assigned to the corresponding outputs 371 and 372.

At step 404, it is determined whether there is a remainder in the calculation performed by the scheduling modules 340, 350, 360, and 370. It is determined that a remainder resulted from the calculations performed by the scheduling modules 340, 350, and 360. Control proceeds to step 405.

At step 405, the remainders are assigned to the outputs at the scheduling modules corresponding to the drift directions. The remainder, 1, is assigned to the output of scheduling module 340 that corresponds to the drift direction. The drift direction for scheduling module 340 is set to the left. Thus, the remainder is assigned to the output 341. The remainder, 1, is assigned to the output of scheduling module 350 that corresponds to the drift direction. The drift direction for scheduling module 350 is set to the left. Thus, the remainder is assigned to the output 351. The remainder, 1, is assigned to the output of scheduling module 360 that corresponds to the drift direction. The drift direction for scheduling module 360 is set to the left. Thus, the remainder is assigned to the output 361.

At step 406, the drift direction at scheduling modules 340, 350, and 360 are switched from the leftward direction to the rightward direction. The drift direction at scheduling module 370 is left alone.

At step 407, the results at the outputs of the scheduling modules are summed. The scheduling module 340 yields the value of 1 at output 341, and 0 at output 342. The scheduling module 350 yields the value 1 at output 351, and 0 at output 352. The scheduling module 360 yields the value of 1 at output 361, and 0 at output 362. The scheduling module 370 yields the value 0 at output 371, and 0 at output 372.

At step 408, it is determined whether n is equal to P, where $2^P$ equals the time slots per frame allocated by the arbitration unit. Since 3 is equal to 3, control proceeds to step 410.

At step 410, a binary permission vector is generated. According to an embodiment of the present invention, the binary permission vector is generated from the outputs of the scheduling module at the highest module level. The outputs of the scheduling modules 340, 350, 360, and 370 are 1, 0, 1, 0, 1, 0, 0, 0 respectively, generating a binary permission vector with the value 10101000.

At step 411, a next allocation number is loaded. The allocation number for the second flow, 4, is loaded into scheduling module 310. Control proceeds to step 402.

FIG. 5b illustrates the scheduling unit 142 processing the second allocation number $a_2=4$ for the second flow. At step 402, n is set to one to indicate that the current stage of processing is being performed at the first module level.

At step 403, allocation numbers are divided. In this example, the allocation numbers 4 for the first flow is divided by 2 by the scheduling module 310. The quotient of the division, 2, is assigned to the corresponding outputs 311 and 312 of the scheduling module 310.

At step 404, it is determined whether there is a remainder from the calculation performed at step 403. It is determined that there is no remainder to the division calculation performed by scheduling module 310. Control thus proceeds to step 407.

At step 407, the results at the outputs of the scheduling modules are summed. The scheduling module 310 yields the value of 2 at output 311, and 2 at output 312. These values are forwarded to their corresponding scheduling modules, 320 and 330 respectively, at the next module level as allocation numbers.

At step 408, it is determined whether n is equal to P, where $2^P$ equals the time slots per frame allocated by the arbitration unit. In this example, P=3. Since 1 is not equal to 3, control proceeds to step 409.

At step 409, n is incremented by one. Control proceeds to step 403.

At step 403, allocation numbers are divided. In this example, the allocation numbers 2 is divided by 2 by the scheduling module 320. The quotient of the division, 1, is assigned to the corresponding outputs of each scheduling module 321 and 322. The allocation numbers 2 is divided by 2 by the scheduling module 330. The quotient of the division, 1, is assigned to the corresponding outputs of each scheduling module 331 and 332.

At step 404, it is determined whether there is a remainder in the calculation performed by the scheduling modules 320 and 330. It is determined that no remainder resulted from the calculations performed by the scheduling modules 330. Control proceeds to step 407.

At step 407, the results at the outputs of the scheduling modules are summed. The scheduling module 320 yields the value of 1 at output 321, and 1 at output 322. The scheduling module 330 yields the value 1 at output 331, and 1 at output 332. These values are forwarded to their corresponding scheduling modules, 340, 350, 360, and 370 respectively, at the next module level as allocation numbers for those scheduling modules.

At step 408, it is determined whether n is equal to P, where $2^P$ equals the time slots per frame allocated by the arbitration unit. Since 2 is not equal to 3, control proceeds to step 409.

At step 409, n is incremented by one. Control proceeds to step 403.

At step 403, allocation numbers are divided. In this example, the allocation number 1 is divided by 2 by the scheduling module 340. The quotient of the division, 0, is assigned to the corresponding outputs 341 and 342. The allocation number 1 is divided by 2 by the scheduling module 350. The quotient of the division, 0, is assigned to the corresponding outputs 351 and 352. The allocation number 1 is divided by 2 by the scheduling module 360. The quotient of the division, 0, is assigned to the corresponding outputs 361 and 362. The allocation number 0 is divided by 2 by the scheduling module 370. The quotient of the division, 0, is assigned to the corresponding outputs 371 and 372.

At step 404, it is determined whether there is a remainder in the calculation performed by the scheduling modules 340, 350, 360, and 370. It is determined that a remainder resulted from the calculations performed by the scheduling modules 340, 350, 360 and 370. Control proceeds to step 405.

At step 405, the remainders are assigned to the outputs at the scheduling modules corresponding to the drift directions. The remainder, 1, is assigned to the output of scheduling module 340 that corresponds to the drift direction. The drift direction for scheduling module 340 is set to the right. Thus, the remainder is assigned to the output 342. The remainder, 1, is assigned to the output of scheduling module 350 that corresponds to the drift direction. The drift direction for scheduling module 350 is set to the right. Thus, the remainder is assigned to the output 352. The remainder, 1, is assigned to the output of scheduling module 360 that corresponds to the drift direction. The drift direction for scheduling module 360 is set to the right. Thus, the remainder is assigned to the output 362. The remainder, 1, is assigned to the output of scheduling module 370 that corresponds to the drift direction. The drift direction for scheduling module 370 is set to the left. Thus, the remainder is assigned to the output 371.

At step 406, the drift directions at scheduling modules 340, 350, and 360 are switched from the rightward direction to the leftward direction. The drift direction at scheduling module 370 is switched from the leftward direction to the rightward direction.

At step 407, the results at the outputs of the scheduling modules are summed. The scheduling module 340 yields the value of 0 at output 341, and 1 at output 342. The scheduling module 350 yields the value 0 at output 351, and 1 at output 352. The scheduling module 360 yields the value of 0 at output 361, and 1 at output 362. The scheduling module 370 yields the value 1 at output 371, and 0 at output 372.

At step 408, it is determined whether n is equal to P, where $2^P$ equals the time slots per frame allocated by the arbitration unit. Since 3 is equal to 3, control proceeds to step 410.

At step 410, a binary permission vector is generated. According to an embodiment of the present invention, the binary permission vector is generated from the outputs of the scheduling module at the highest module level. The outputs of the scheduling modules 340, 350, 360, and 370 are 0, 1, 0, 1, 0, 1, 1, 0 respectively, generating a binary permission vector with the value 0101010110.

At step 411, a next allocation number is loaded. The allocation number for the third flow, 1, is loaded into scheduling module 310. Control proceeds to step 402.

FIG. 5c illustrates the scheduling unit 142 processing the third allocation number $a_3=1$ for the third flow. At step 402, n is set to one to indicate that the current stage of processing is being performed at the first module level.

At step 403, allocation numbers are divided. In this example, the allocation numbers 1 for the first flow is divided by 2 by the scheduling module 310. The quotient of the division, 0, is assigned to the corresponding outputs 311 and 312 of the scheduling module 310.

At step 404, it is determined whether there is a remainder from the calculation performed at step 403. It is determined that there is a remainder to the division calculation performed by scheduling module 310. Control thus proceeds to step 405.

At step 405, the remainders are assigned to the outputs at the scheduling modules corresponding to the drift directions. In this example, the remainder, 1, is assigned to the output of scheduling module 310 that corresponds to the drift direction. The drift direction for scheduling module 310 is set to the right. Thus, the remainder is assigned to the output 312.

At step 406, drift directions at scheduling modules producing remainders are switched. In this example, the drift direction at scheduling module 310 is switched from the rightward direction to the leftward direction.

At step 407, the results at the outputs of the scheduling modules are summed. The scheduling module 310 yields the value of 0 at output 311, and 1 at output 312. These values are forwarded to their corresponding scheduling modules, 320 and 330 respectively, at the next module level as allocation numbers.

At step 408, it is determined whether n is equal to P, where $2^P$ equals the time slots per frame allocated by the arbitration unit. In this example, P=3. Since 1 is not equal to 3, control proceeds to step 409.

At step 409, n is incremented by one. Control proceeds to step 403.

At step 403, allocation numbers are divided. In this example, the allocation numbers 0 is divided by 2 by the scheduling module 320. The quotient of the division, 0, is assigned to the corresponding outputs of each scheduling module 321 and 322. The allocation numbers 1 is divided by 2 by the scheduling module 330. The quotient of the division, 0, is assigned to the corresponding outputs of each scheduling module 331 and 332.

At step 404, it is determined whether there is a remainder in the calculation performed by the scheduling modules 320 and 330. It is determined that a remainder resulted from the calculations performed by the scheduling modules 330. Control proceeds to step 405.

At step 405, the remainders are assigned to the outputs at the scheduling modules corresponding to the drift directions. The remainder, 1, is assigned to the output of scheduling module 330 that corresponds to the drift direction of scheduling module 330. The drift direction for scheduling module 330 is set to the right. Thus, the remainder is assigned to the rightmost output 332.

At step 406, drift directions at scheduling modules producing remainders are switched. In this example, the drift direction at scheduling module 330 is switched from the rightward direction to the leftward direction. The drift direction at scheduling module 320 is left alone.

At step 407, the results at the outputs of the scheduling modules are summed. The scheduling module 320 yields the value of 0 at output 321, and 0 at output 322. The scheduling module 330 yields the value 0 at output 331, and 1 at output 332. These values are forwarded to their corresponding scheduling modules, 340, 350, 360, and 370 respectively, at the next module level as allocation numbers for those scheduling modules.

At step 408, it is determined whether n is equal to P, where $2^P$ equals the time slots per frame allocated by the arbitration unit. Since 2 is not equal to 3, control proceeds to step 409.

At step 409, n is incremented by one. Control proceeds to step 403.

At step 403, allocation numbers are divided. In this example, the allocation number 0 is divided by 2 by the scheduling module 340. The quotient of the division, 0, is assigned to the corresponding outputs 341 and 342. The allocation number 0 is divided by 2 by the scheduling module 350. The quotient of the division, 0, is assigned to the corresponding outputs 351 and 352. The allocation number 0 is divided by 2 by the scheduling module 360. The quotient of the division, 0, is assigned to the corresponding outputs 361 and 362. The allocation number 1 is divided by 2 by the scheduling module 370. The quotient of the division, 0, is assigned to the corresponding outputs 371 and 372.

At step 404, it is determined whether there is a remainder in the calculation performed by the scheduling modules 340, 350, 360, and 370. It is determined that a remainder resulted from the calculations performed by the scheduling module 370. Control proceeds to step 405.

At step 405, the remainders are assigned to the outputs at the scheduling modules corresponding to the drift directions. The remainder, 1, is assigned to the output of scheduling module 370 that corresponds to the drift direction. The drift direction for scheduling module 340 is set to the right. Thus, the remainder is assigned to the output 372.

At step 406, the drift direction at scheduling module 370 is switched from the leftward direction to the rightward direction. The drift direction at scheduling modules 340, 350, and 360 are left alone.

At step 407, the results at the outputs of the scheduling modules are summed. The scheduling module 340 yields the value of 0 at output 341, and 0 at output 342. The scheduling module 350 yields the value 0 at output 351, and 0 at output 352. The scheduling module 360 yields the value of 0 at output 361, and 0 at output 362. The scheduling module 370 yields the value 0 at output 371, and 1 at output 372.

At step 408, it is determined whether n is equal to P, where $2^P$ equals the time slots per frame allocated by the arbitration unit. Since 3 is equal to 3, control proceeds to step 410.

At step 410, a binary permission vector is generated. According to an embodiment of the present invention, the binary permission vector is generated from the outputs of the scheduling module at the highest module level. The outputs of the scheduling modules 340, 350, 360, and 370 are 0, 0, 0, 0, 0, 0, 0, 1 respectively, generating a binary permission vector with the value 00000001.

At step 411, a next allocation number is loaded. Since all the allocation numbers have been processed, control terminates processing.

The scheduling instructions transmitted by the arbitration unit 140 to the memory manager 110 may be in the form of a plurality of binary permission vectors where a single binary vector is designated to scheduling a specific flow.

Alternatively, the arbitration unit 140 may transmit a single integer permission vector that identifies which of the flows if any is allowed to send a packet during a specific time slot. The integer permission vector requires N+1 symbols where N equals the number of flows that are scheduled by the arbitration unit 140. One symbol is required for representing each flow and an additional symbol is required to represent no flow or an empty slot.

To create an integer permission vector, the binary permission vectors may be passed into a counter (not shown) having a plurality of parallel counter modules. The parallel counter modules counts the number of zeros that arrive on input bit lines until a one arrives. When a one arrives, the count at a counter module is incremented a last time after which the counter module is disabled. After all N binary permission vectors have been created, the parallel counter modules outputs the value of the counter.

Figure 6:
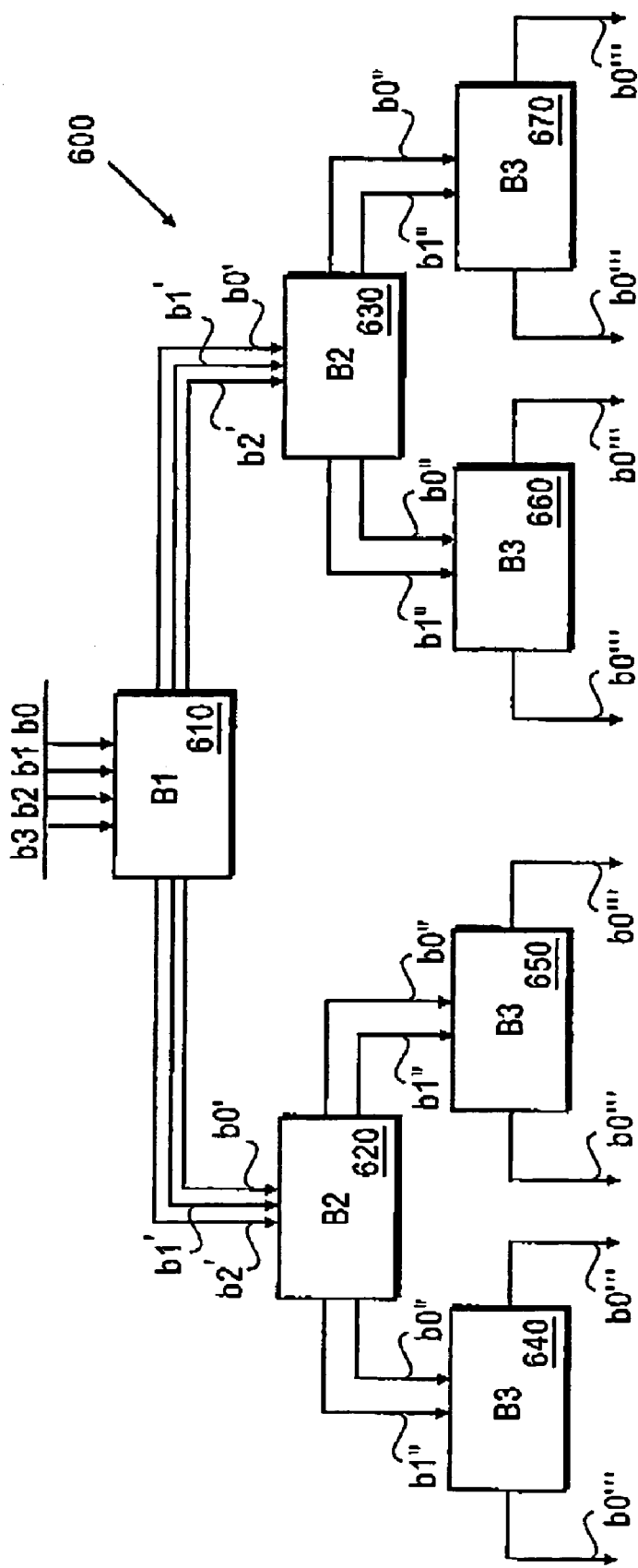
FIG. 6 is block diagram of an alternate perspective of the scheduling unit shown in FIG. 3.

FIG. 6 illustrates a block diagram of an alternate perspective of the scheduling unit shown in FIG. 3 according to an embodiment of the present invention. The input to the scheduling unit 600 is an allocation number. For T=8, four bit-lines are necessary. Each of the "B" modules 310, 320, 330, 340, 350, 360, and 370 performs the division-by-two and remainder assignment functions. The index associated with each "B" module indicates the stage in which it performs the division-by-two and remainder assignment functions. B1 module 610 may be one implementation of scheduling module 310 (shown in FIG. 3). B2 modules 620 and 630 may be implementations of scheduling modules 320 and 330 respectively (shown in FIG. 3). B3 modules 640, 650, 660, and 670 may be implementations of scheduling modules 340, 350, 360, and 370 respectively (shown in FIG. 3). The number of parallel bit-lines connecting the "B" modules decrease by one at each stage because the largest possible result at stage S is $T/2^S=2^P/2^S=2^{P-S}$. The output of the scheduling unit 600 are T bit-lines.

Figure 7A:
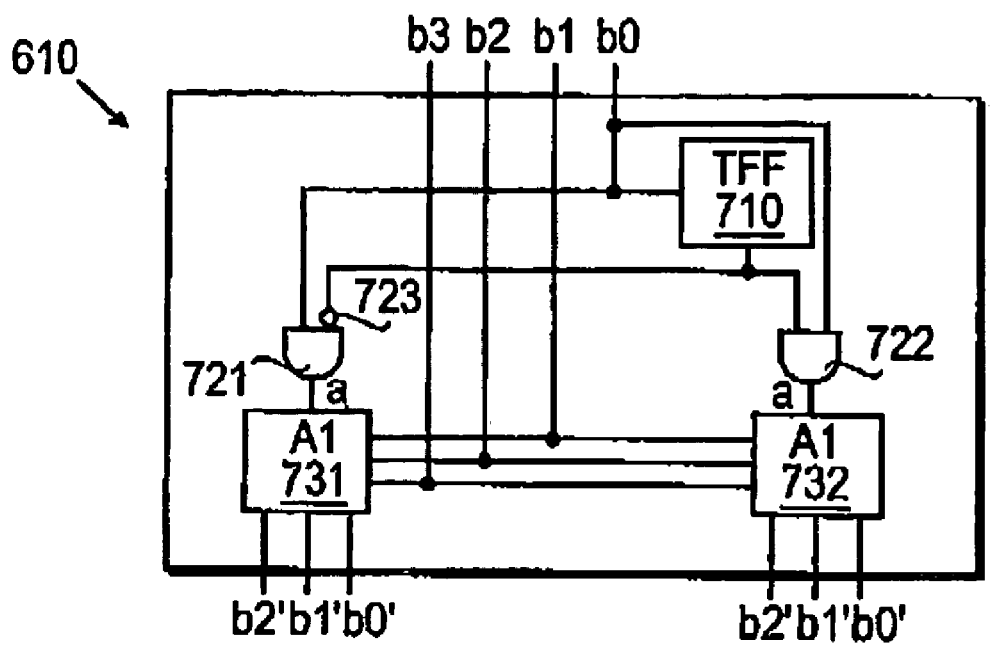
FIG. 7a is a circuit diagram of a B1 module according to an embodiment of the present invention.
Figure 7B:
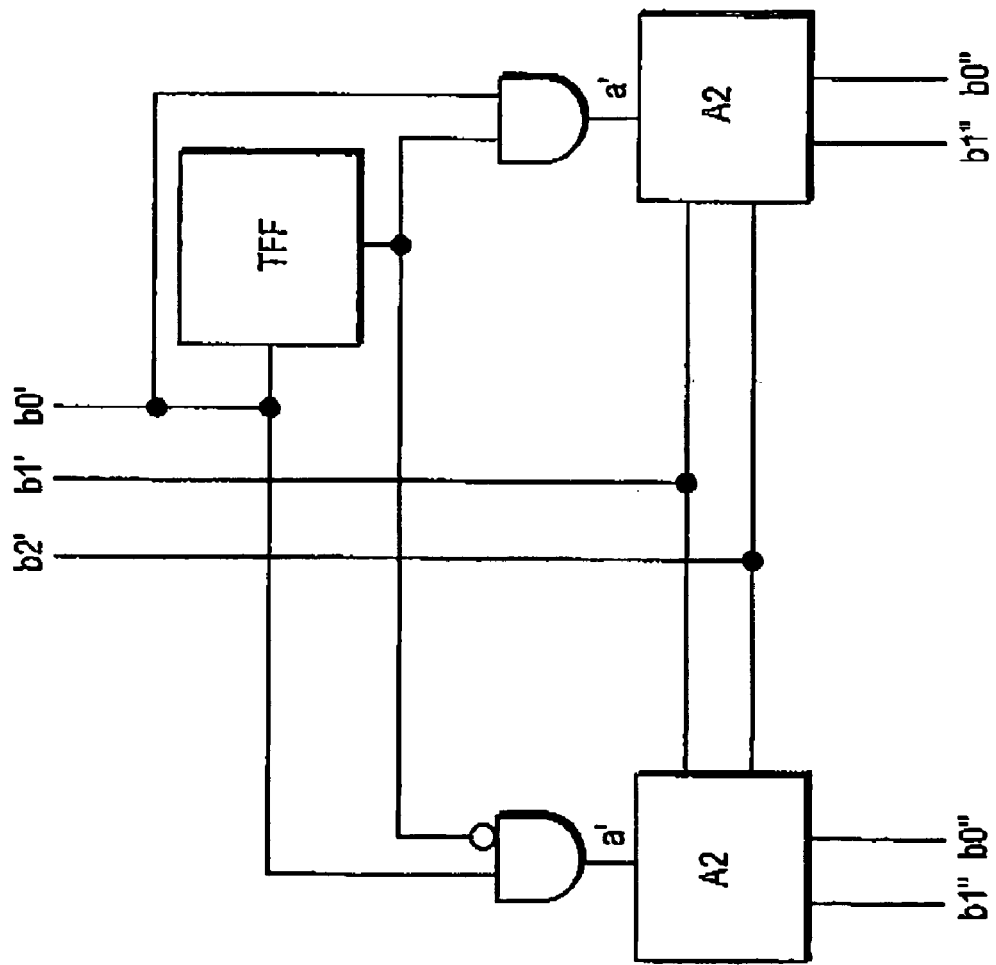
FIG. 7b is a circuit diagram of a B2 module according to an embodiment of the present invention.
Figure 7C:
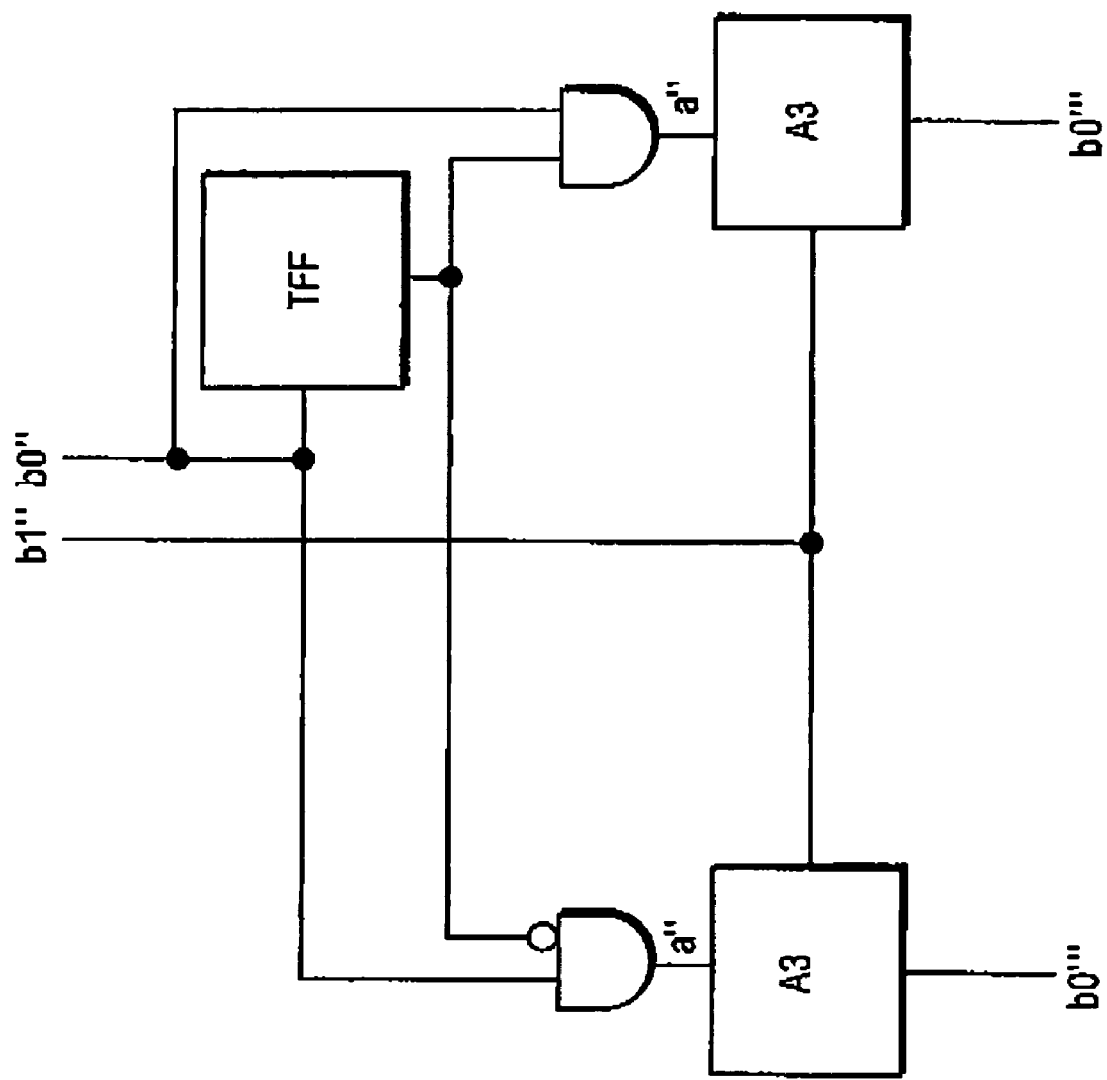
FIG. 7c is a circuit diagram of a B3 module according to an embodiment of the present invention.

FIG. 7a illustrates an embodiment of the B1 module 610 shown in FIG. 6. The B1 module 610 includes a toggle flip flop 710, AND gates 721 and 722, an inverter 723, and two "A" modules 731 and 732. The division by two is accomplished by stripping off the lower-order bit (the remainder bit, b0). The toggle flip flop 710, the two AND gates 721 and 722, and the inverter 723 determine the direction of remainder drift according to the remainder drift rule. The "A" modules 731 and 732 adds 1 to the binary number on its input lines if its corresponding "a" line is high. The "B" modules at the other stages are similar to the B1 module 610 with the exception of the number of input and output lines and the "A" module versions. FIGS. 7b and 7c illustrate embodiments of the B2 and B3 modules respectively according to an embodiment of the scheduling unit 600.

Figure 8A:
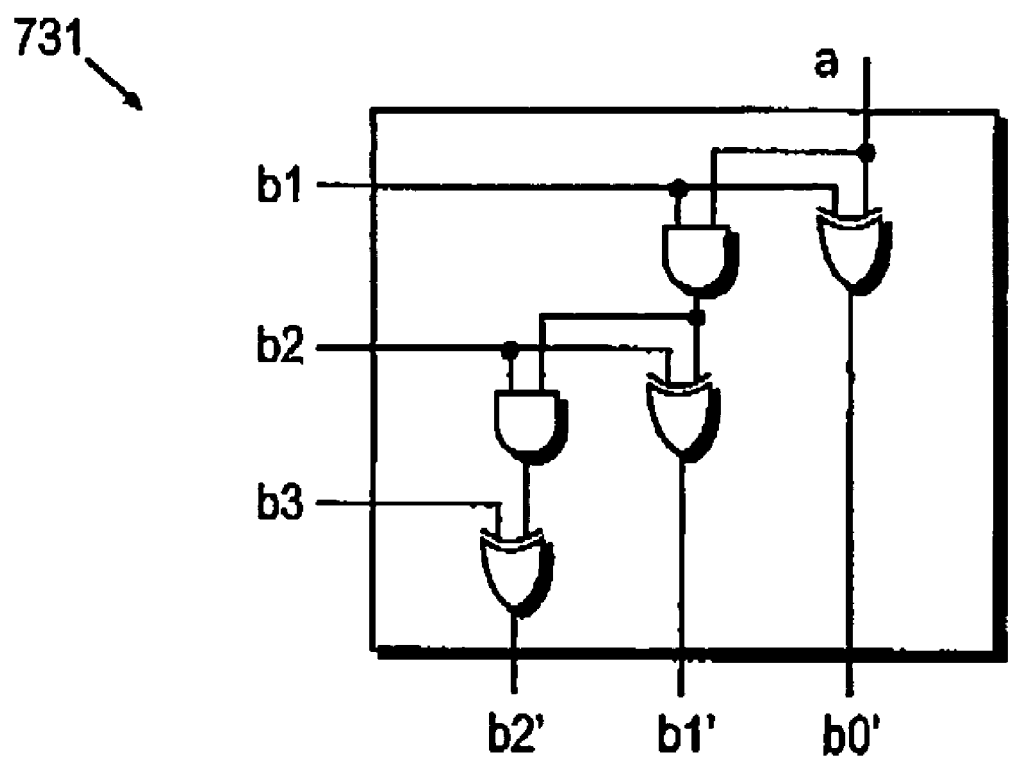
FIG. 8a is a circuit diagram of an A1 module according to an embodiment of the present invention.
Figure 8B:
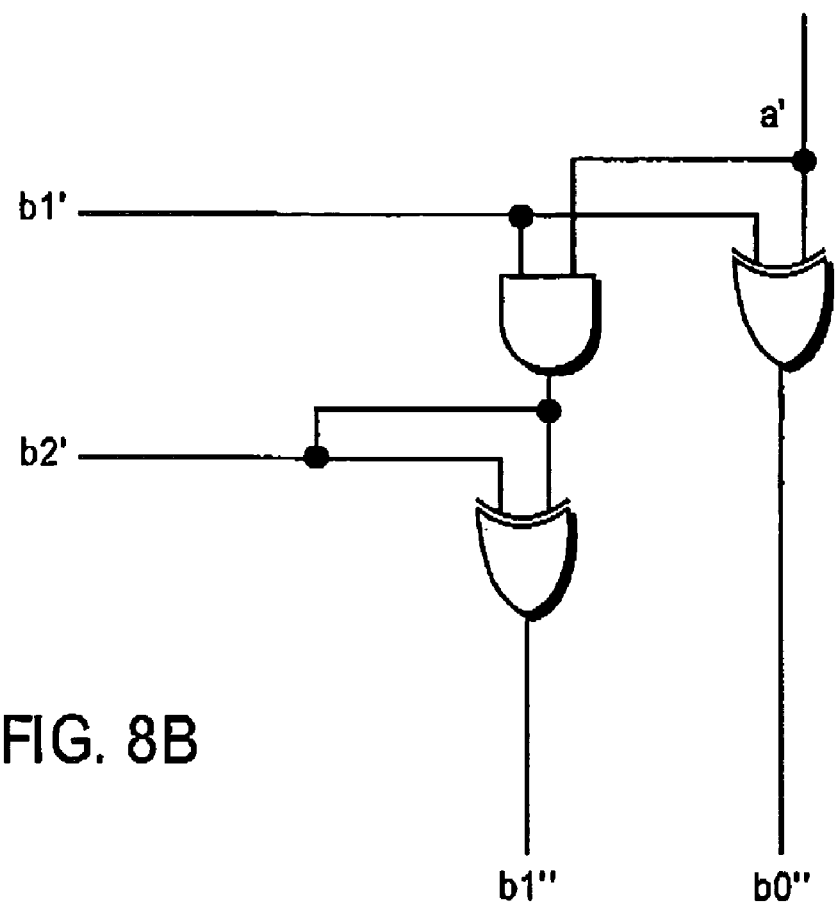
FIG. 8b is a circuit diagram of an A2 module according to an embodiment of the present invention.
Figure 8C:
FIG. 8c is a circuit diagram of an A3 module according to an embodiment of the present invention.

FIG. 8a illustrates an embodiment of the A1 module 731 according to an embodiment of the present invention. An $A_S$ module (where S is the stage number) can be implemented using P+1−S XOR gates and P−S AND gates. FIGS. 8b and 8c illustrate embodiments of the A2 and A3 modules respectively according to an embodiment of the scheduling unit 600. According to an embodiment of the present invention, the entire scheduling unit 600 may be implemented using 4T−2P−4 AND gates, 4T−2P−4 XOR gates, T−1 toggle flip flops, and T−1 inverters.

Referring back to FIG. 6, multiple allocation numbers may be pipelined through the scheduling unit 600. For example, while the B3 modules process a first allocation number, the B2 modules may process a second allocation, and the B1 module may process a first allocation number. FIG. 6 illustrates a hardware implementation of scheduling unit 142. It should be appreciated that scheduling unit 142 may also be implemented in software or a combination of hardware and software.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. An arbitration unit, comprising:
    an allocation unit to assign a first number of slots in a frame to a first flow and a second number of slots in the frame to a second flow; and
    a scheduling unit to assign first slot positions to the first number of slots in the frame and second slot positions to the second number of slots in the frame using a binary distribution tree, wherein the scheduling unit includes a plurality of modules, each including a divider, a module memory to identify an output previously assigned a first remainder, and an adder to add a second remainder to a number allocated to an output previously not assigned the first remainder.

2. The arbitration unit of claim 1, wherein the first flow and the second flow are flows of discrete packets.

3. The arbitration unit of claim 1, wherein the binary distribution tree generates a binary permission vector (BPV) for each of the first and second flows.

4. An arbitration unit comprising
    an allocation unit to assign a first number of slots in a frame to a first flow and a second number of slots in the frame to a second flow; and
    a scheduling unit to assign first slot positions to the first number of slots in the frame and second slot positions to the second number of slots in the frame using a binary distribution tree, wherein the scheduling unit comprises a plurality of modules, each of the plurality of module divides an allocation number by two between two outputs of the module, and assigns any remainder between one of the two outputs that had not most recently been assigned a previous remainder.

5. The arbitration unit of claim 1, wherein the scheduling unit comprises a plurality of modules, each including:
    a divider;
    a module memory that is to identify an output which was previously assigned a first remainder; and
    an adder that is capable to add a second remainder to a number allocated to an output that had previously not been assigned the first remainder.

6. The arbitration unit of claim 1, wherein the divider divides a binary number by two by stripping off the lower-order bit of the binary number.

7. The arbitration unit of claim 1, wherein the module memory comprises:
    a toggle flip-flop;
    a plurality of gates that perform an ANDing function; and
    an inverter.

8. An arbitration unit, comprising
    an allocation wilt to assign a first number of slots in a frame to a first flow and a second number of slots in the frame to a second flow; and
        a scheduling unit to assign first slot positions to the first number of slots in the frame and second slot positions to the second number of slots in the frame using a binary distribution tree, wherein the binary distribution tree includes P levels of modules, where $2^P$ is the maximum number of slots assignable to any frame.

9. The arbitration unit of claim 8, wherein each module has two corresponding output.

10. The arbitration unit of claim 9, wherein each module in the binary distribution tree comprises:
a divider that divides an input number evenly between outputs of a module; and a module memory that is to select which of the outputs of the module to transmit a remainder.

11. The arbitration unit of claim 10, wherein the module memory is configured to alternate transmission of the remainder between the outputs of the module.

12. The arbitration unit of claim 8, further comprising a vector processing unit that converts a plurality of binary permission vectors into a single integer permission vectors.

13. The arbitration unit of claim 12, wherein the vector processing unit comprises a plurality of counter modules.

14. The arbitration unit of claim 8, wherein a first level of scheduling module is to process an allocation number corresponding to a first flow while a second level of scheduling module is processing an allocation number corresponding to a second flow.

15. A method for generating binary permission vectors, comprising:
setting a common drift direction at bifurcation points in a binary distribution tree;
dividing allocation numbers associated with a first flow by two at the bifurcation points;
assigning quotients from the dividing of the allocation numbers associated with the first flow to branches at the bifurcation points;
assigning a remainder from the dividing of the allocation numbers associated with the first flow to a branch that corresponds to a drift direction at the bifurcation point where the remainder exists;
switching the drift direction at the bifurcation point where the remainder exists; and
reading outputs from the binary distribution tree as elements in a first binary permission vector.

16. The method of claim 15, wherein setting the common drift direction at the bifurcation points in the binary distribution tree comprises assigning a leftward drift to scheduling modules on a scheduling unit.

17. The method of claim 15, wherein dividing the allocation numbers associated with the first flow comprises dividing an allocation number of the first flow and dividing values generated from dividing the allocation number of the first flow.

18. The method of claim 15, further comprising:
dividing allocation numbers associated with a second flow by two at the bifurcation points;
assigning quotients from the dividing of the allocation numbers associated with the second flow to the branches at the bifurcation points;
assigning a remainder from the dividing of the allocation numbers associated with the second flow to a branch that corresponds to a drift direction at the bifurcation point where the remainder exists;
switching the drift direction at the bifurcation point where the remainder exists; and
reading the outputs from the binary distribution tree as elements in a second binary permission vector.

19. The method of claim 18, wherein the dividing of allocation numbers associated with the second flow is performed concurrently with the dividing of allocation numbers associated with the first flow.

20. The method of claim 18, further comprising generating an integer permission vector from the first binary permission vector and the second binary permission vector.

21. An arbitration unit, comprising:
means for assigning a first number of slots in a frame to a first flow and a second number of slots in the frame to a second flow; and
means for assigning first slot positions to the first number of slots in the frame and second slot positions to the second number of slots in the frame using a binary distribution tree, wherein binary distribution tree includes P levels of modules, where $2^P$ is the maximum number of slots assignable to any frame.

* * * * *